United States Patent
Sohrt et al.

(10) Patent No.: US 6,203,053 B1
(45) Date of Patent: Mar. 20, 2001

(54) MOBILE CARRIER FOR AUGMENTATIVE COMMUNICATION DEVICE

(76) Inventors: Thomas M. Sohrt; Carrie Sohrt-McCormick, both of P.O. Box 10028, Costa Mesa, CA (US) 92627

( * ) Notice: Subject to any disclaimer, the term of this patent is extended or adjusted under 35 U.S.C. 154(b) by 0 days.

(21) Appl. No.: 09/322,189

(22) Filed: May 28, 1999

(51) Int. Cl.$^7$ .................................................. B62B 3/02
(52) U.S. Cl. ........................ 280/641; 280/651; 280/652; 280/654; 280/655; 280/645; 248/129
(58) Field of Search .................................. 280/651, 641, 280/645, 652, 654, 655, 655.1, 47.18, 47.19; 248/129

(56) References Cited

U.S. PATENT DOCUMENTS

| | | | |
|---|---|---|---|
| 1,718,962 | * 7/1929 | Kimball | 280/655 |
| 2,141,881 | * 12/1938 | Schray | 280/36 |
| 2,234,358 | * 3/1941 | Schray | 280/36 |
| 2,422,862 | * 6/1947 | Stottrup | 280/36 |
| 2,872,967 | * 2/1959 | Kirkpatrick | 155/22 |
| 4,236,462 | * 12/1980 | Berthier et al. | 108/177 |
| 4,337,960 | * 7/1982 | Stewart | 280/47.371 |
| 4,896,897 | * 1/1990 | Wilhelm | 280/655 |
| 4,962,781 | * 10/1990 | Kanbar | 135/65 |
| 5,078,414 | * 1/1992 | Court et al. | 280/42 |
| 5,090,724 | * 2/1992 | Fiore | 280/643 |
| 5,251,925 | * 10/1993 | Haley, Sr. | 280/641 |
| 5,354,089 | 10/1994 | Sohrt et al. . | |
| 5,618,055 | * 4/1997 | Mulholland | 280/641 |
| 5,918,841 | * 7/1999 | Sweere et al. | 248/123.11 |

* cited by examiner

Primary Examiner—Brian L. Johnson
Assistant Examiner—Deanna Draper
(74) Attorney, Agent, or Firm—James G. O'Neill

(57) ABSTRACT

A mobile carrier for an augmentative communication device or laptop computer contains a supporting tray enabling a user to slidably adjust the height of the tray for optimum usage. The mobile carrier is easily pushed or pulled to accommodate a user's needs by the use of four wheels, the front two of which are smaller and pivot, and the rear two of which are larger for ease in movement over obstacles. The handle of the mobile carrier is adjustable, and preferably T-shaped, to enable a person to rest on the same when needed, or to pull or push the carrier from either side, when needed. After removal of a pin, the carrier is easily folded into a compressed position, and various elements thereof may be easily removed for ease in storage or transportation thereof.

12 Claims, 4 Drawing Sheets

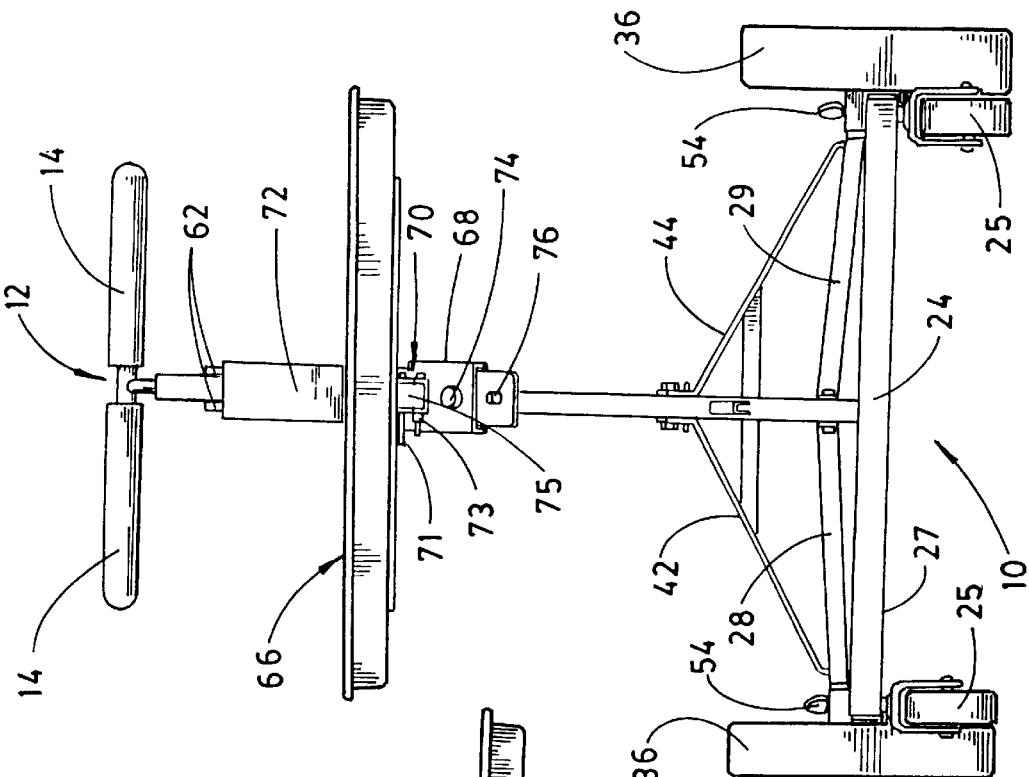
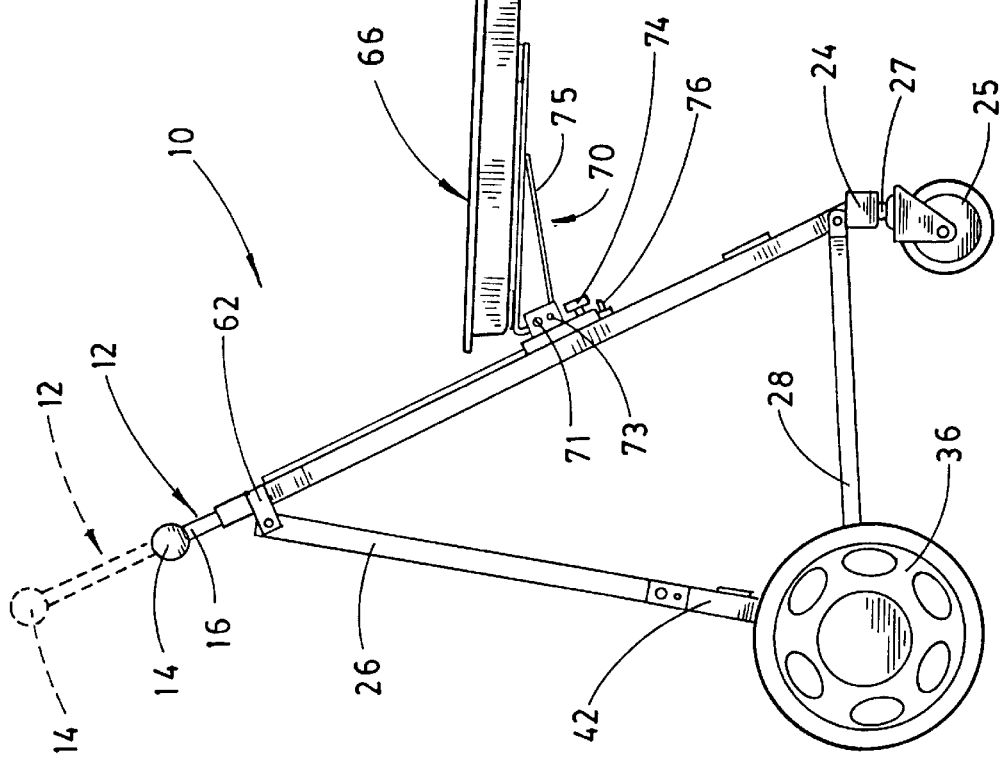

MOBILE CARRIER FOR AUGMENTATIVE COMMUNICATION DEVICE

BACKGROUND OF THE INVENTION

1. Field of the Invention

This invention relates generally to transport carriers and devices, and, more particularly, to a mobile carrier to easily transport devices needed by physically challenged persons, and particularly, augmentative communication devices, or computers, for use by such persons.

2. Description of Related Art

Communication is the essences of human life, and the ability to achieve and move forward is often dependent on such ability. For those not born with an ability to communicate, or for those who have limited communication skills, life is often difficult and uncontrollable. However, new technology, such as laptop computers and augmentive communication devices have been conceived and brought to the market to help impaired individuals.

The market availability of such devices has granted people who lack the ability to communicate an opportunity to do so. Such devices allow individuals who are thought never to have the capability of achieving, to grow and create bright futures for themselves, and their loved ones.

There are a variety of augmentive communication devices available. Such devices vary in size, shape, weight and complexity, but all have some form of computerized voice, and a selection of letters, words or complete thoughts that a user may choose from. Some of these devices portray, by pictures, the thoughts to be transmitted. All such devices may be changed by a user, and enhance as the user's intelligence progresses.

Laptop computers may also be used by non-oral persons. Such laptop computers may also be modified to act as an augmentive communication device. Therefore, laptop computers and augmentive communication devices have created greater freedom for non-oral people. Furthermore, for non-ambulatory persons, a unit has been designed which is held by a specially designed mounting bracket on a wheelchair, or the like. This allows the wheelchair occupant to use the communication unit whenever and wherever they want. This mounting bracket, however, is not adaptable, and may not be easily moved.

U.S. Pat. No. 5,354,089 to Sohrt et al. discloses a mobile carrier for an augmentive communication device for use by semi-ambulant persons. This carrier may be pushed or pulled to accommodate a user's preference for walking and their disability. The handle of this carrier is adjusted to accommodate different persons of different heights, as well as to adapt to an individual's needs, depending on the severity of their handicap. The carrier is foldable, so as to be easily transported in a small space. The disclosure of U.S. Pat. No. 5,354,089 ("'089") is incorporated in its entirety herein, by this reference thereto. The device disclosed in the '089 patent contains only two wheels, is not as strong or durable, and has been found not to be useful for all uses, nor in all circumstances.

There, therefore, exists a need for a carrier device to help semi-ambulatory, non-oral persons over some of their challenges when using and transporting augmentive communication devices. Additionally, such an improved carrier should be easily pushed or pulled by a person and, at the same time, stronger so as to stand up under substantially all conditions of use.

SUMMARY OF THE INVENTION

Accordingly, it is a general object of the present invention to provide an improved mobile carrier for an augmentative communication device. It is a particular object of the present invention to provide an improved mobile carrier for an augmentative communication device, which may be easily pushed or pulled to accommodate a user's preference for walking and disability. It is a still more particular object of the present invention to provide an improved mobile carrier for an augmentative communication device designed with a high degree of strength and durability. It is yet another particular object of the present invention to provide an improved mobile carrier for an augmentative communication device having both front and rear wheels, with the rear wheels being wider to enable better stability, better control and enhanced safety. And, it is yet still another particular object of the present invention to provide an improved mobile carrier for an augmentative communication device with better maneuverability and increased stability for greater independence, and which can be used as a mobile cane giving a user a support system to lean on when walking.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

FIG. 2 is a side elevational view of the mobile carrier of FIG. 1, with a front carrier tray thereof in a lowered position;

FIG. 3 is a front elevational view of the mobile carrier of FIG. 1, with a front carrier tray in a lowered position;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved mobile carrier, generally indicated at 10.

Figure 1:
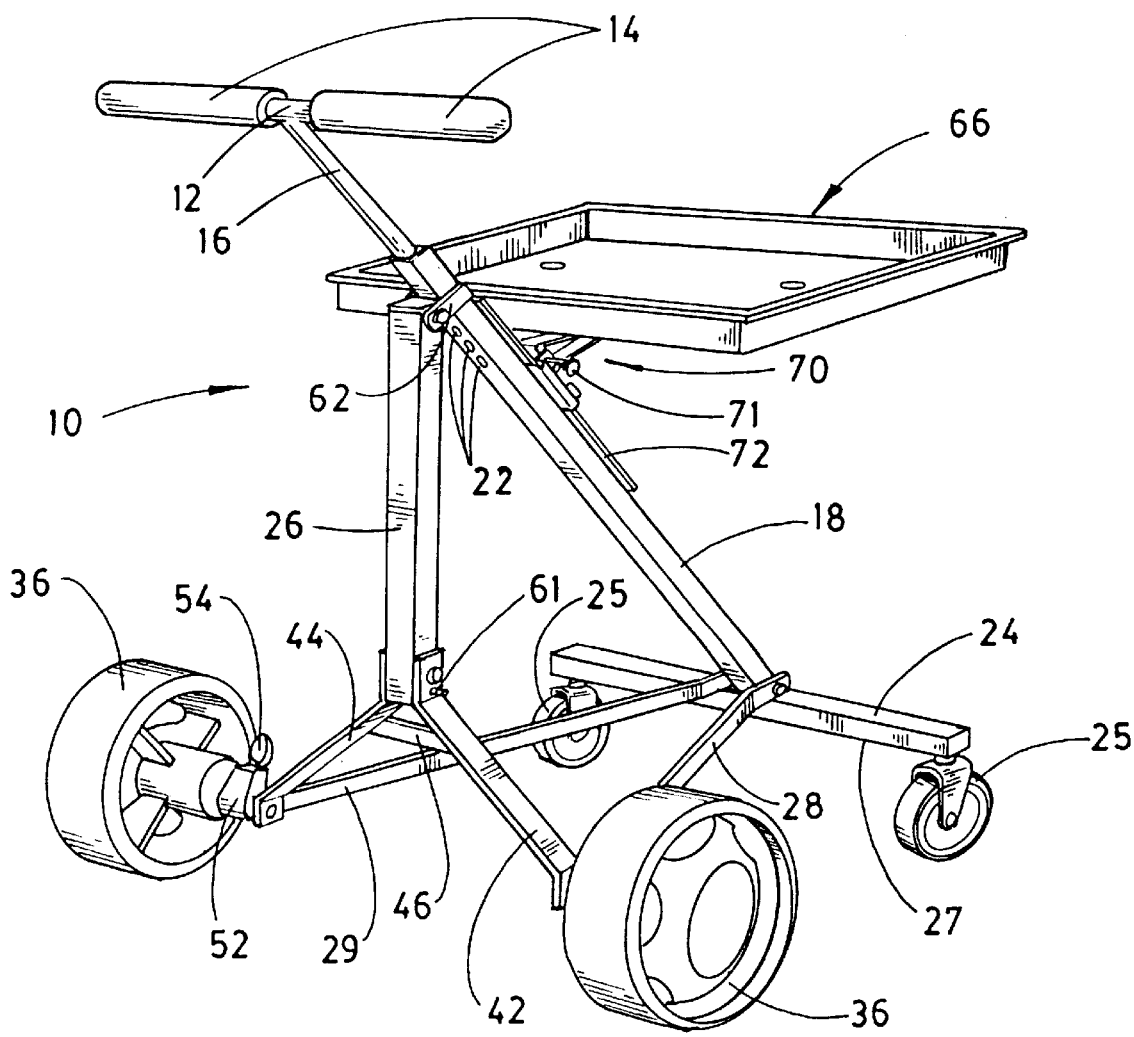
FIG. 1 is a perspective view from the rear of the mobile carrier of the present invention in a rest position.

The description and operation of the mobile carrier 10 of the present invention will be best described with reference to FIGS. 1–3, which show the mobile carrier 10 in a rest position, and FIG. 4, which shows it in an exploded position. The mobile carrier 10 includes a handle 12, which is preferably T-shaped, having foam protective coatings or sleeves 14 on hand holding portions thereof.

The handle 12 and the remaining items or parts of the mobile carrier 10 are preferably made from a number 304 stainless steel tube, unless otherwise specified herein. The tubing may be circular or square, depending on where it is used, and for what purpose.

The T-shaped handle 12 has a lower, elongated body portion 16 inserted and adjustably held within a rectangularshaped front body portion 18, which is preferably angled or slanted. The lower portion 16 includes a retractable pin 20, which is selectively held in a plurality of openings 22, formed at a top end of the angled, rectangular tubular body portion 18 to enable the handle 12 to be adjustably positioned within the body portion 18, as shown in FIGS. 1, 2, 3 and 5.

The angled front body portion 18 is part of a body comprised of this angled front tube 18, and a lower horizontal bar or tube 24, to which it is perpendicularly secured, as by welding. The outer ends of this horizontal bar 24 are provided with pivoting wheels 25 held in openings formed in a lower surface 27 of the horizontal bar.

Figure 4:
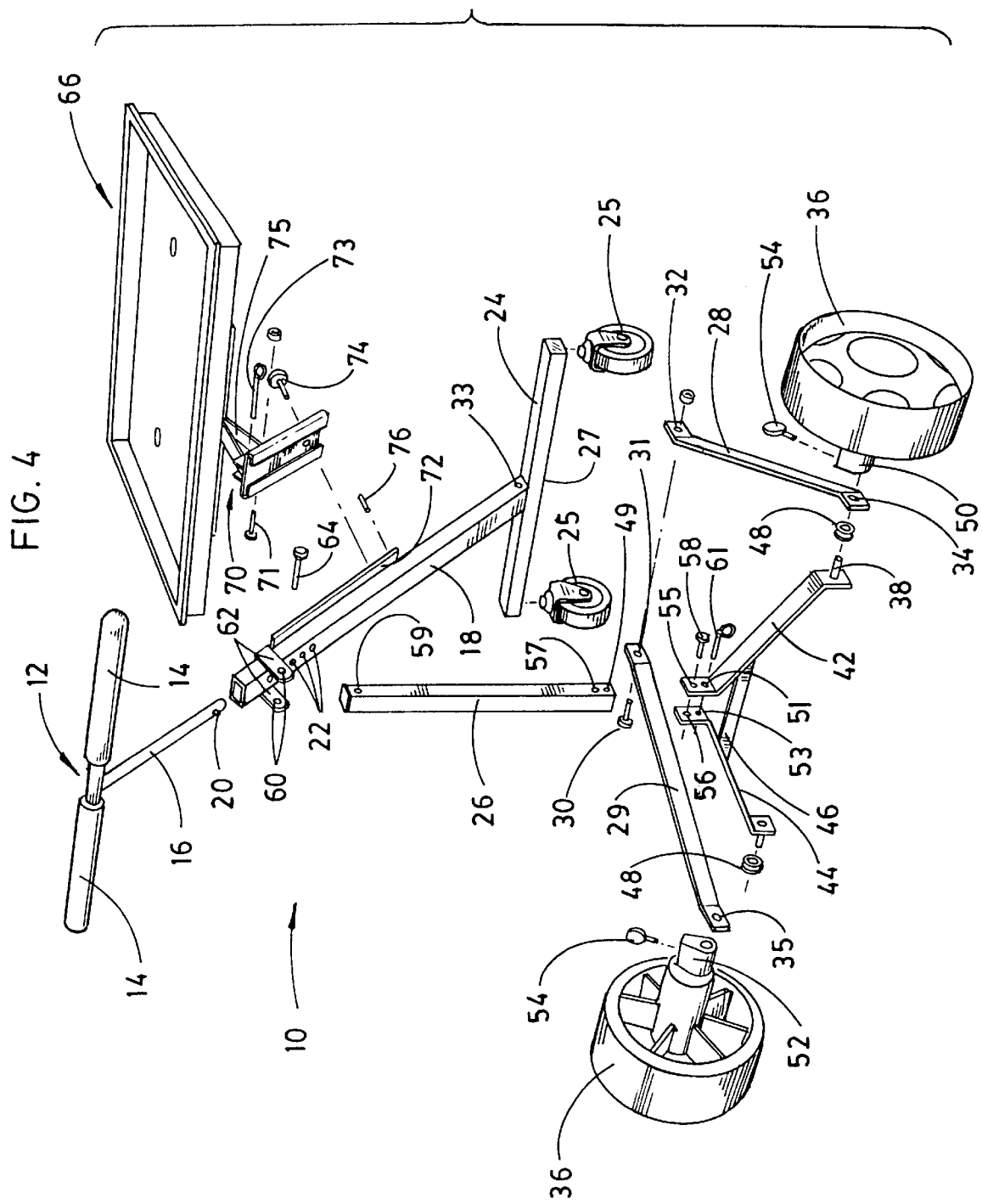
FIG. 4 is an exploded perspective view of the mobile carrier of the present invention.

First and second stabilizing bars 28, 29, preferably made from flat steel, are rotatably attached at first ends to a lower portion of the front tube 18, adjacent horizontal bar 24, as by means of a securing means 30, such as a pin, or nut and bolt, passing through openings 31, 32, in the first ends of the stabilizer bars 28, 29, and openings 33 in a lower portion of the tube 18 (see FIG. 4). A rear or second end portion of each stabilizer bar 28, 29 includes a further aperture 34, 35, to which are attached rear wheels 36. The rear wheels 36 are preferably larger than the front wheels 25. The rear wheels 36 are secured in the apertures 34, 35 by means of aligned axle members or pins 38, 40 formed on lower ends of angled flat stabilizing struts 42, 44 having a strengthening bar or member 46 secured thereto. Each of the aligned pin members 38, 40 extend through one of the apertures 34, 35, in stabilizing bars 28, 29, with spacer elements 48, such as washers or the like, held on either or both sides, and are captured in hub members 50, 52, secured to the rear wheels 36, as by means of securing elements, such as thumbscrews 54.

Upper ends of each of the angled struts 42, 44 are bent so as to contact and be rotatably held in a lower end of a back or rear support 26, and include further apertures 51, 53, 55, 56 which are aligned with apertures 49, 57 formed in the lower end of the back support bar 26. Means for securing 58, 61, such as a removable pin, or a nut and bolt, are inserted and held in the aligned apertures in the upper ends of the struts 42, 44 and the lower end of support bar 26.

An upper end of the back support 26 is rotatably held to the front tube 18 by further apertures 59, which apertures 59 are held within aligned apertures 60 on a pair of brackets, or a single bracket 62, secured to an upper end of the front tube 18. A further bolt or holding member 64, such as a pin, or the like, is secured in the apertures 59 and 60 so as to rotatably hold the upper end of the rear tube 26 therein.

The angled front tube portion 18 of the mobile carrier 10 pivotably and slidably carries a tray 66 thereon. The tray 66 is used to support an augmentative communication device, a laptop computer, or the like, directly on the tray, or in a bracket, stand, or the like, held in the tray so as to support the device within the tray at a desired angle. The tray 66 is pivotably or rotatably mounted on a sliding plate 68 in any desired manner, as by means for holding 70, which may include a removable pin 71 and a pivot pin 73, as well as a leaf spring 75, and/or other supporting members. The sliding plate 68 is captured on a rail element or plate 72, which is welded or otherwise secured to a flat front portion of the front tube 18, toward the top end thereof. A securing means 74, such as a thumbscrew, or the like, which may be spring biased, releasably holds the sliding plate 68 to the rail 72, in any desired position. Upon releasing the thumbscrew 74, as by pulling or unscrewing the same, the sliding plate 68 and tray 66 may be slid between a lower position defined by a stop element 76 and an upper position defined by the bracket 62.

Figure 5:
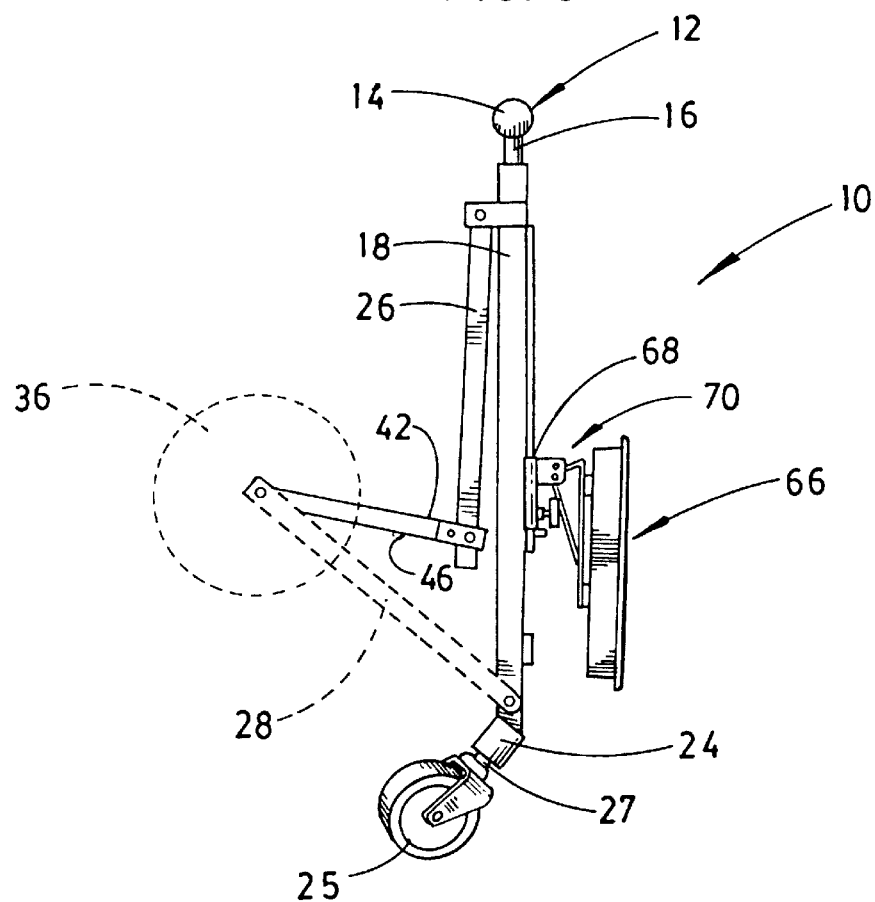
FIG. 5 is a side elevational view of the mobile carrier of the present invention, illustrating its folded position, and an incremental or intermediate position between its folded and unfolded positions.
Figure 6:
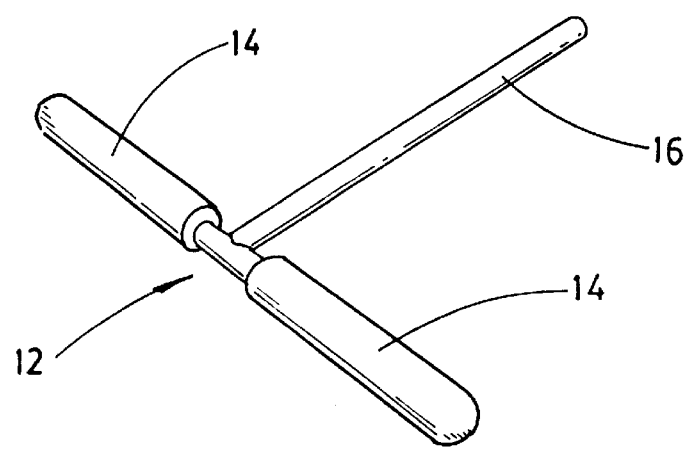
FIG. 6 is a perspective view of the handle shown in FIGS. 1–5.

As best shown in FIG. 5, the mobile carrier 10 of the present invention may be folded into a flatter position for easy storage and transport. This is accomplished by pulling out removable pin 61 from apertures 49, 51, 53, and then pushing the back support 26 toward the front support 18, while rotating the stabilizing struts 28, 29 and 42, 44 towards back support 26, thereby rotating the larger rear wheels 36 toward the front support 18. Additionally, as shown in FIGS. 4 and 6, the body 16 of handle 12 may be slid out of the front tubular element 18, as by pressing in the retractable pin 20, for storage elsewhere, or in the tray 66. The larger rear wheels 36 may also be removed, by releasing the thumbscrews 54 from pins 38, 40, for storage and/or replacement.

It, therefore, can be seen that the improved mobile carrier of the present invention provides an easily utilized carrier which can be adjusted in height, and by movement of a handle and/or tray, for ease in use, by different size persons, or for growing persons. The improved mobile carrier also may be easily disassembled and folded for storage or ease in transporting the same, in a vehicle, or the like. The overall construction forms a sturdier, more durable mobile carrier with far greater versatility. The two different size front and rear wheels 25 and 36 are used to enable a user to easily push or pull the carrier in any desired direction, or over substantially any type of surface. Furthermore, the pivoting front wheels allow the carrier to mount a curb or driveway without undue problems or delay. Thus, the more versatile and sturdy mobile carrier of the present invention allows a user to have an enhanced lifestyle.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A mobile carrier for an augmentative communication device, comprising:

a plurality of wheels for providing rolling support; the plurality of wheels comprising a first pair of wheels and a second pair of wheels;

an elongated back support having a first end pivotally engaging an elongated front support, and a second end;

the elongated front support having a first end and a second end, and engaging the back support near the first end of the elongated front support;

a plurality of second apertures in the elongated back support near the second end of the elongated back support and a pair of first apertures in the elongated back support at the first end;

handle means engaging the elongated front support near the first end of the elongated front support to facilitate movement of the mobile carrier;

a front horizontal bar secured to the second end of the elongated front support with the first pair of wheels secured at outer ends of the front horizontal bar;

a pair of stabilizer bars pivotably mounted by outer ends thereof on the second end of the elongated front support, adjacent the front horizontal bar;

the pair of stabilizer bars, including inner ends having apertures formed therein, and rotatably carrying the second pair of wheels; which second pair of wheels are larger in diameter than the first pair of wheels; and a support tray pivotably mounted on a plate, which plate is slidably mounted on the elongated front support between lower and upper stops.

2. The mobile carrier of claim 1 wherein the first pair of wheels are pivotably mounted in the front horizontal bar, and the larger second pair of wheels are releasably mounted to the inner ends of the pair of stabilizer bars by holding means connected to the elongated back support.

3. The mobile carrier of claim 1, further including a rail secured to the elongated front support with the plate slidably mounted on the rail.

4. The mobile carrier of claim 3 wherein the pins formed at the lower ends of the angled struts rotatably carry the larger, second wheels.

5. The mobile carrier of claim 1, further including a rail secured to the elongated front support, and the plate is slidably mounted on the rail.

6. The mobile carrier of claim 5, further including angled struts connected to the second end of the elongated back support, which angled struts include pins formed at lower ends; the pins rotatably carrying the larger second wheels thereon; and further including a releasable pin held in aligned openings at upper ends of the angled struts and the second end of the elongated back support.

7. A mobile carrier for an augmentative communication device, comprising:
- a first pair of front wheels and a second pair of larger rear wheels;
- an elongated front support having a first end and a second end;
- a back support having an upper end pivotably engaging the elongated front support, and a lower end engaging a pair of struts;
- a pair of first apertures formed in the elongated back support near the upper end, and a plurality of second apertures formed in the elongated back support at the lower end;
- handle means releasably secured in the first end of the elongated front support to facilitate movement of the mobile carrier;
- a front horizontal bar secured to the second end of the elongated front support, and having the first pair of front wheels pivotably mounted at outer ends thereof;
- a pair of stabilizer bars pivotably mounted by outer ends thereof on the second end of the elongated front support, adjacent the front horizontal bar;
- the pair of stabilizer bars, including inner ends having openings formed therein, connected to a pair of struts, and rotatably carrying the second pair of larger wheels; and
- a support tray is pivotably mounted on a plate, which plate is slidably mounted on the elongated front support between lower and upper stops.

8. The mobile carrier of claim 7 wherein the pair of struts are angled, and include a plurality of openings formed in upper ends for releasably and pivotably holding the upper ends in the plurality of second apertures in the elongated back support at the lower end; and pin means carried in lower ends of the angled struts and held in the apertures formed in the inner ends of the pair of stabilizer bars.

9. The mobile carrier of claim 7, further including a rail secured to the elongated front support, and the plate is slidably mounted on the rail.

10. The mobile carrier of claim 9 wherein the pins means carried in the lower ends of the angled struts rotatably carry the larger second wheels thereon.

11. A mobile carrier for an augmentative communication device, comprising:
- a first pair of front wheels and a second pair of larger rear wheels;
- an elongated front support having a first end and a second end;
- a back support having an upper end pivotably engaging the elongated front support, and a lower end engaging a pair of struts;
- a pair of first apertures in the elongated back support near the upper end, and a plurality of second apertures in the elongated back support at the lower end;
- handle means releasably secured in the first end of the elongated front support to facilitate movement of the mobile carrier;
- a front bar perpendicularly secured to the second end of the elongated front support, with the first pair of front wheels pivotably mounted at outer ends of the front bar;
- a pair of stabilizer bars pivotably mounted by outer ends thereof on the second end of the elongated front support, adjacent the front bar;
- the pair of stabilizer bars, including inner ends having apertures formed therein, connected to a pair of struts, and rotatably carrying the second pair of larger wheels;
- a slidable tray mounted on a plate, slidably mounted on a rail system secured to the elongated front support; and
- the slidable tray being pivotably mounted on the plate and being sildably movable between upper and lower stops on the elongated front support.

12. The mobile carrier of claim 11 wherein the handle means is removable from the first end of the elongated front support, and the pair of struts have pins carried in lower ends, which pins rotatably carry the second pair of larger wheels.

* * * * *